(12) United States Patent
Klein et al.

(10) Patent No.: US 6,704,729 B1
(45) Date of Patent: Mar. 9, 2004

(54) RETRIEVAL OF RELEVANT INFORMATION CATEGORIES

(75) Inventors: Adrian C. Klein, Seattle, WA (US); Fajen M. Kyne, Seattle, WA (US); Theodore L. Michel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/575,481

(22) Filed: May 19, 2000

(51) Int. Cl.[7] .............................. G06F 17/30; G06F 7/00
(52) U.S. Cl. ......................................................... 707/5
(58) Field of Search .......................... 707/3, 5; 345/700

(56) References Cited

U.S. PATENT DOCUMENTS

| | | | | |
|---|---|---|---|---|
| 5,819,258 A | * | 10/1998 | Vaithyanathan et al. | 707/2 |
| 5,875,446 A | * | 2/1999 | Brown et al. | 345/970.1 |
| 5,924,090 A | * | 7/1999 | Krellenstein | 707/3 |
| 5,940,821 A | * | 8/1999 | Wical | 707/3 |
| 5,991,756 A | | 11/1999 | Wu | 707/3 |
| 6,012,053 A | * | 1/2000 | Pant et al. | 345/866 |
| 6,112,203 A | * | 8/2000 | Bharat et al. | 707/102 |
| 6,223,145 B1 | * | 4/2001 | Hearst | 703/22 |
| 6,366,910 B1 | * | 4/2002 | Rajaraman et al. | 707/5 |
| 6,385,602 B1 | * | 5/2002 | Tso et al. | 707/3 |
| 6,397,209 B1 | * | 5/2002 | Reed et al. | 707/100 |
| 6,397,218 B1 | * | 5/2002 | Stern et al. | 707/10 |

OTHER PUBLICATIONS

YAHOO Website, http://search.yahoo.com/search, printed Jan. 12, 2000, 6 pages.

\* cited by examiner

*Primary Examiner*—Greta Robinson
*Assistant Examiner*—Susan Rayyan
(74) *Attorney, Agent, or Firm*—Woodcock Washburn LLP

(57) ABSTRACT

Large stores of information are often organized in a hierarchical taxonomy to aid a search and retrieval of the information. The hierarchical taxonomy generally consists of related categories of information, called "nodes," that each may contain information relevant to the search. Each node is addressable according to its path in the hierarchical taxonomy. In information stores where the number of nodes having relevant information is extremely large, such as the Internet, providing a cohesive, intelligent, and organized display of the search results becomes extremely important to the success of a user traversing the store to find relevant information. The invention provides such search results by ranking each node of the taxonomy to determine which nodes are most likely to be relevant to the search request. The invention then creates a conceptually-related "cluster" of nodes by selecting a relevant "seed" node and relevant nodes related to the "seed" node.

35 Claims, 9 Drawing Sheets

Category Matches (1-18 of 18)

201 Entertainment > Genres > Science Fiction and Fantasy > Star Trek

202 Entertainment > Movies and Film > Genres > Science Fiction and Fantasy > Series > Star Trek 203 Entertainment > Humor > By Topic > Science Fiction and Fantasy > Star Trek 204 News and Media > Television > Genres > Science Fiction and Fantasy > Star Trek 205 Net Events > Entertainment > Television > Shows > Science Fiction, Fantasy, and Horror > Star Trek 206 Business and Economy > Companies > Entertainment > Movies and Film > Memorabilia > Science Fiction > Star Trek 207 News and Media > Television > Genres > Science Fiction and Fantasy > Star Trek > Star Trek: Voyager 208 Recreation > Games > Strategy > Star Trek: The Next Generation 209 Recreation > Games > Strategy > Star Trek: Rebellion 210 Entertainment > Movies and Film > Genres > Science Fiction and Fantasy > Series > Star Trek > Star Trek: Insurrection 211 News and Media > Television > Genres > Science Fiction and Fantasy > Star Trek > Star Trek: Original Series 212 Net Events > Entertainment > Television > Shows > Science Fiction, Fantasy, and Horror > Star Trek > Star Trek: Voyager 213 Entertainment > Movies and Film > Genres > Science Fiction and Fantasy > Series > Star Trek > Star Trek: Generations 214 Entertainment > Movies and Film > Genres > Science Fiction and Fantasy > Series > Star Trek > Star Trek: The Motion Picture 215 Entertainment > Genres > Science Fiction and Fantasy > Star Trek > Star Trek: The Experience 216 Regional > Countries > United Kingdom > Entertainment > Genres > Science Fiction and Fantasy > Star Trek 217 Regional > Countries > Germany > News and Media > Television > Shows > Star Trek 218 Regional > Countries > Australia > Entertainment > Genres > Science Fiction and Fantasy > Star Trek

Figure 2 (Prior Art)

RETRIEVAL OF RELEVANT INFORMATION CATEGORIES

TECHNICAL FIELD

The present invention relates to the field of electronic data storage and retrieval. More specifically, the present invention relates to selecting categories of information in an Internet search engine database, based on a user's query.

BACKGROUND OF THE INVENTION

The Internet is a vast store of information, permitting access to tens of millions of web sites. Although the ever-increasing number of web sites are creating record access to information, the sheer number of sites available make it difficult for an Internet user to locate desired information. As a result, Internet search engines have become a necessary and valuable tool for locating information on the Internet Not all search engines employ the same search strategy. Some Internet search engines return a "flat" list of results indexed according to a web site's similarity to a user's query. Although these lists are useful, the vast expanse of the Internet has reduced their effectiveness. Other Internet search engines take a different approach and catalog individual web sites into hierarchical taxonomies of categories based on the site's content. These category-based search engines not only return the most relevant web sites, but also lists of matching categories that describe and encompass relevant web sites in order to help users focus their query. In addition, these category-based search engines often display the matching category along with their hierarchically related categories in "category paths" in order to place the matching category in a proper context.

For some time, these categorization techniques were sufficient to provide search engine users with intelligible suggestions. However, just as previous Internet growth necessitated categorization over "flat" result lists, the Internet's recent exponential growth has limited the effectiveness of these taxonomy techniques. In particular, the rapid growth of the Internet has caused a corresponding expansion in the number of categories found in today's search engine taxonomies. As a result, simply categorizing web sites and displaying category paths has become unwieldy and unintelligible, often resulting in tens or hundreds of returned category paths. Moreover, the lack of differentiation among the many returned category paths often results in logical redundancies and even irrelevant search results. Therefore, although today's category paths are better than their predecessor "flat" lists of web sites, they have been rendered ineffective by the Internet's exponential growth.

Therefore, it would be beneficial to provide a logical distinction among the many possible matching categories and their category paths. In this way, the user can more easily sort through the returned results and more quickly focus the search to obtain the desired results.

SUMMARY OF THE INVENTION

Large stores of information are often organized in a hierarchical taxonomy to aid a search and retrieval of the information. The hierarchical taxonomy generally consists of related categories of information, called "nodes," that each may contain information relevant to the search. Each node is addressable according to its path in the hierarchical taxonomy. In information stores where the number of nodes having relevant information is extremely large, such as the Internet, providing a cohesive, intelligent, and organized display of the search results becomes extremely important to the success of a user traversing the store to find relevant information. The invention provides such search results by ranking each node of the taxonomy to determine which nodes are most likely to be relevant to the search request. The invention then creates a conceptually-related "cluster" of nodes by selecting a relevant "seed" node and relevant nodes related to the "seed" node.

More specifically, the invention provides a method, system and computer-readable medium for selecting nodes in a hierarchical taxonomy. The method comprises the steps of receiving a query and comparing characteristics of the nodes with the query. The method ranks the nodes based on a predetermined criteria and selects a first node based on the ranking. The predetermined criteria may be based on common structure between the nodes and the query. Also, based on the ranking, the method selects one or more nodes that are hierarchically related to the first node. The method may then display the first node and the related nodes in such a way that the relation of the nodes is apparent. The method may be repeated to select additional relevant nodes and their related nodes.

BRIEF DESCRIPTION OF THE DRAWINGS

Other features of the invention are further apparent from the following detailed description of presently preferred embodiments of the invention taken in conjunction with the accompanying drawings, of which:

FIG. 2 is an example of a prior art search result from a search engine using the branch/node hierarchical taxonomy tree shown in FIG. 1B;

DETAILED DESCRIPTION OF THE INVENTION

Branch/Node Taxonomy

Figure 1A:
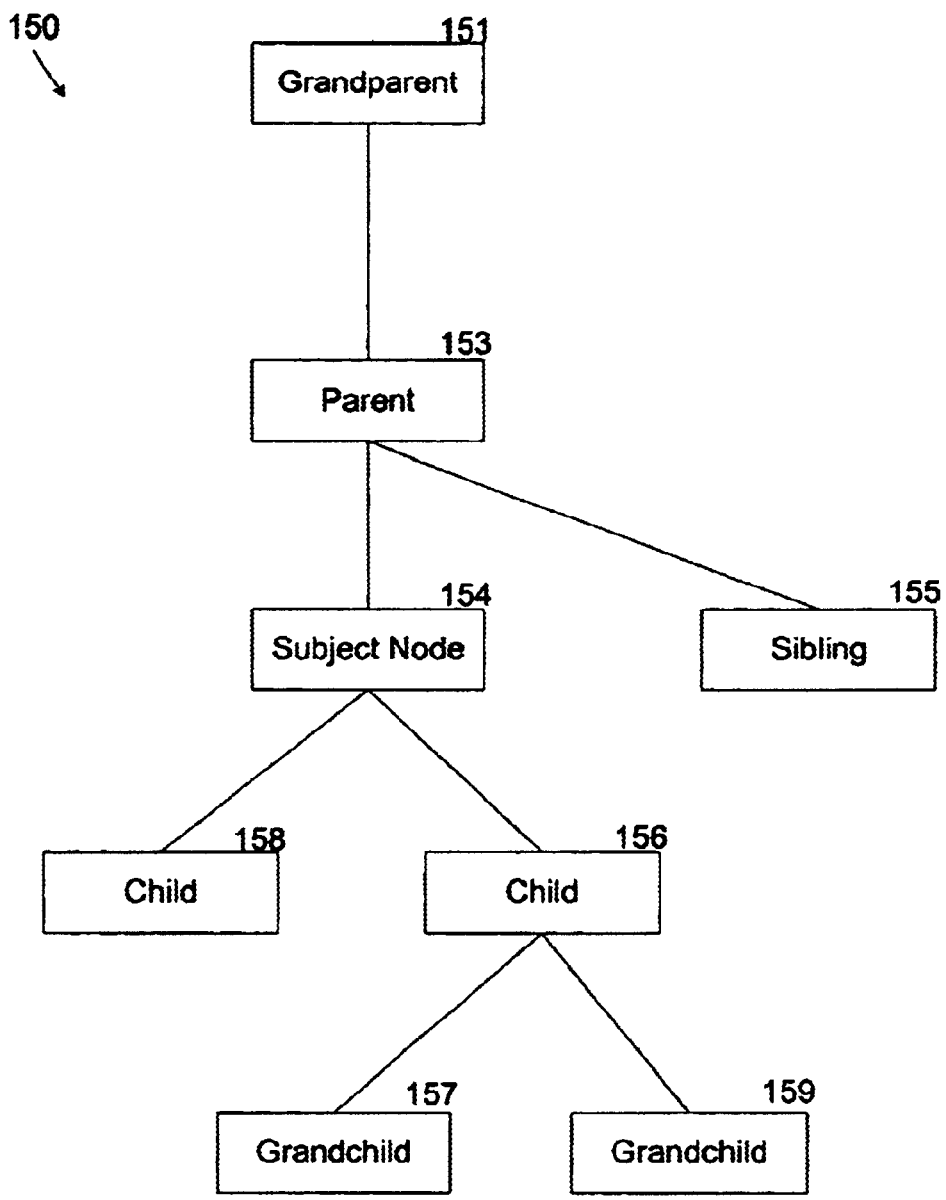
FIG. 1A is a generic branch/node hierarchical taxonomy tree.

A branch/node taxonomy is one type of hierarchical taxonomy. FIG. 1A illustrates a generic branch/node taxonomy 150. A subject node 154 represents the starting point. In the context of an Internet search engine, subject node 154 may represent one category that is sufficiently similar to a user's query. A parent node 153 is a node that is one level higher (or one category broader) than subject node 154, and a grandparent node 151 is two levels higher (or two categories broader) than subject node 154. Child nodes 156, 158 are nodes that are one level lower (or one category narrower) than subject node 154, and grandchild nodes 157, 159 are two levels lower (or two categories narrower) than subject node 154. A sibling node 155 is a node that is on an equal level with subject node 154. In addition, further levels of "great" nodes (not shown) may be present in either direction (e.g., great grandparent and great-great grandchild).

Each node is addressable according to its path in the hierarchical taxonomy. This path is created by traversing the branches connecting subject node 154 with ancestor nodes (i.e., grandparent and parent) and descendent nodes (ie., children, grandchildren and siblings). This path, called a node path or category path, may be written in the form "grandparent/parent/subject node/sibling/child." Although placing the sibling in the path is not truly hierarchical and may not be necessary, in some instances it may be helpful in placing the category path in its context. By employing such a standard, the relation of the nodes to subject node 154 immediately is apparent, regardless of the node's displayed titles. Notably, the displayed "category paths" may have multiple levels of grandparents (i.e., "great grandparents") as well as multiple levels of grandchildren (i.e., "great grandchildren").

In the context of a search engine, category paths may be used to display search results. In this instance, the subject node is the node in the category path that most nearly matches a query, called the "matching node." Thus category paths permit the display of search term-relevant categories (i.e., matching or subject node) in the context of other topically-related, but perhaps less search term-relevant relative categories (i.e., parent, grandparent, sibling and children). Displaying a matching node along with its relative nodes is helpful for at least three reasons: (1) because the additional relative nodes are both broader and narrower than the matching node, users are offered alternatives should their search term inadequately describe the desired information; (2) by offering alternatives, users are presented with related areas that they may not have been aware of, but likely would be interested in because of the relationship of the category to their query; and (3) the additional relative nodes place the matching node in context, so that the significance of the matching node more easily is understood. In any case, users may select a related node rather than having to reformulate, or even abandon, their search.

Figure 1B:
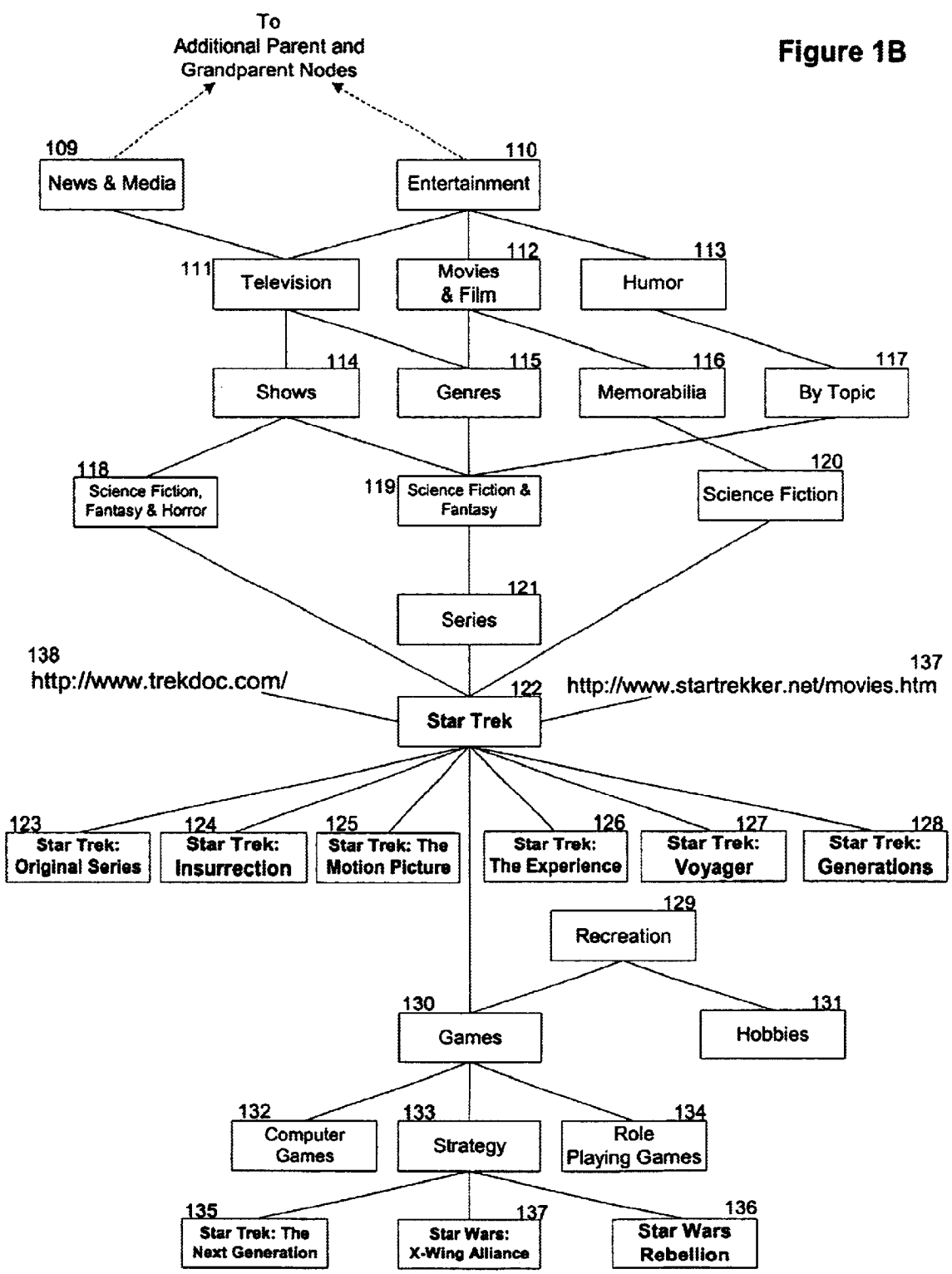
FIG. 1B is an example of a branch/node hierarchical taxonomy tree with category titles.

FIG. 1B is a portion of a branch/node taxonomy tree 100 for an Internet search engine, wherein each node 109–137 has a category title or label relating to a search term "Star Trek." The category titles go from broad to more narrow topics, as tree 100 is traversed top to bottom. In the context of Internet search engines, the nodes represent predefined category titles that may describe and encompass individual web sites. In this example, node titles 122–128, 135 and 136 (shown bolded) are "matching nodes," or nodes whose titles or content satisfy some predetermined degree of commonality with an inputted query. It should be appreciated that tree 100 is just one example of a portion of a tree, and that in practice, the tree likely would comprise different node titles for the same search, and many more nodes relevant to other searches. For example, additional parent and grandparent nodes (as indicated) may exist in tree 100.

Describing the interrelation among nodes is similar to that detailed in FIG. 1A. Thus, using "Science Fiction & Fantasy" node 119 as subject node 154, the following nodes are parent nodes 153: "Shows" node 114, "Genres" node 115, and "By Topic" node 117. "Television" node 111, "Movies & Film" node 112, and "Humor" node 113 are grandparent nodes 151. "Science Fiction, Fantasy & Horror" node 118 and "Science Fiction" node 120 are sibling nodes 155. "Series" node 121 is the only child node 156, and "Star Trek" node 122 is the only grandchild node 157. This process may continue in either direction as great grandparent nodes and great grandchildren nodes.

In addition to having other categories as a child, a node may, as shown for node 122, have associated child web sites "http://www.startrekker.net/movies.htm" 137 and "http://www.trekdoc.com/" 138. Notably, each node's relative (ie., grandparent, parent, child or sibling) may also have individual web sites as children (not shown). However, it is unlikely that the broader category nodes, like "Entertainment" node 110, will have web sites as children because no one web site will capture the essence of such a broad category.

Displaying a matching node along with its relative nodes is even more useful in the context of the Internet, where related nodes and matching nodes may be displayed as a hypertext transfer protocol (http) link or a hyperlink. The hyperlink allows users to jump to the related node with a mouse-click. Users are then presented with categories and web sites directly related to the selected category. This is also true of any computer application where hyperlinks are available, including word processing software, for example.

Result Set From Prior Art Search Engine

FIG. 2 is a sample result set from a prior art search engine that demonstrates the limitations in the prior art, using hierarchical taxonomy tree 100 shown in FIG. 1B. The result set shown in FIG. 2 is based on a search of the phrase "Star Trek." Although the precise content and quantity of the category paths will vary depending on the titles defined in the taxonomy, FIG. 2 provides a representative sample of expected results, and thus highlights the limitations in the prior art. In practice, a user may expect many more matching nodes, and thus many more displayed paths, further emphasizing the ineffectiveness of prior art search engine categorization techniques. Although the term "node" was used in describing the category titles in the hierarchical taxonomy of FIG. 1B, the term "category" will be used in reference to the search result of FIG. 2. However, it should be appreciated that these terms are interchangeable, depending on the context of the discussion.

As shown in FIG. 2, a query on the phrase "Star Trek" results in the display of eighteen category paths 201–218. Each of category paths 201–218 contains a bolded member. The bolded members of category paths 201–218 represent the matching category and the non-bolded members represent categories related to the matching category. For example, category path 202 is "Entertainment>Movies and Film>Genres>Science Fiction and Fantasy>Series>Star Trek." As shown in FIG. 1B, "Star Trek" node 122 is the matching category. "Series" node 121 and "Science Fiction and Fantasy" node 119 are the parent and grandparent categories, respectively. Stated differently, "Star Trek" 122 is one of a number of "Series" 121 in the "Science Fiction and Fantasy" 119 "Genre" 115 of "Movies and Film" 112, which is one form of "Entertainment" 110.

A user who searches for "Star Trek" and receives this search path is able to broaden the search and see other science fiction and fantasy movies simply by selecting "Science Fiction and Fantasy" grandparent node 119 link. Moreover, because the entire category path provides a context for its individual node members, the user will recognize that selecting "Series" 121 node link will provide science fiction and fantasy movie series, and not a television comedy series, for example.

The problem with the prior art result set is that number of displayed results is too long to quickly browse. More importantly, among eighteen displayed category paths 201–218 are various redundancies and irrelevancies. Specifically, the search phrase "Star Trek" although resulting in just nine matching categories 122–128, 135, 136, results in eighteen different category paths 201–218 in the search engine's hierarchical taxonomy. Therefore, it is apparent that certain of matching categories 122–128, 135, 136 appear in more than one category path. In this example, "Star Trek" node 122 appears in nine category paths 201–206 and 216–218.

Occasionally, such redundancy is desired where the matching category's relatives differ significantly. For example, although both contain matching category 122, category path "Entertainment>Genres>Science Fiction and Fantasy>Star Trek" 201 and category path "Regional>Countries>Germany>News and Media>Television>Shows>Star Trek" 217 are sufficiently different to justify their display. However, more often the redundancy is unnecessary and makes the individual category paths more difficult to distinguish. For example, category paths 201 and 202 are similar except that category path 202 provides two additional categories "Movies and Film" 112 and "Series" 121. Also, category paths 210, 213, and 214 provide the same hierarchy "Entertainment>Movies and Film>Genres>Science Fiction and Fantasy>Series>Star Trek" but different children "Star Trek: Insurrection" 124, "Star Trek: Generations" 128, and "Star Trek: The Motion Picture" 125, respectively, for matching node "Star Trek" 122.

The displayed result set in FIG. 2, however, does not readily indicate the redundancy. Instead, users are forced to correlate the individual category paths on their own. This task often is made difficult by the fact that many other category paths separate the redundant paths. Thus, the user is left to distinguish among the tens or hundreds of individual category paths. Forced to compare and distinguish among these many resulting category paths, the user often abandons reviewing the matching category paths before reaching the end of the displayed result set.

Operating Environment

Figure 3:
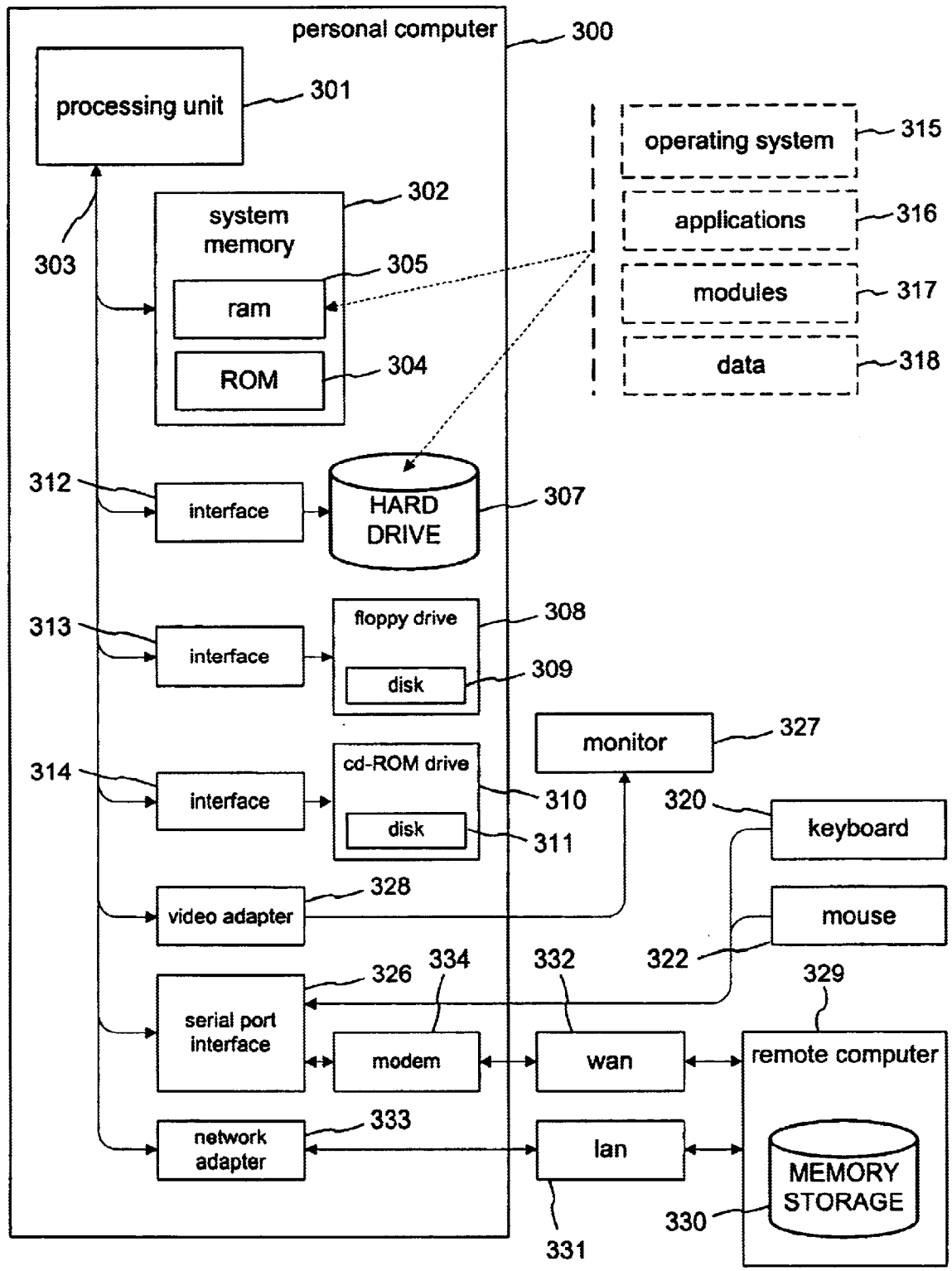
FIG. 3 is a block diagram of a suitable computing environment in which the present invention may be implemented.

FIG. 3 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. However, some embodiments of the invention can be practiced on standalone computers. In a distributed computing environment, program modules may be located in both local and remote memory storage devices.

With reference to FIG. 3, one system for implementing the invention includes a conventional personal computer 300, including a processing unit 301, a system memory 302, and a system bus 303 that couples various system components including the system memory to the processing unit 301. Processing unit 301 may be any of various commercially available processors. Dual microprocessors and other multiprocessor architectures also can be used as processing unit 301.

System bus 303 may be any of several types of bus structure including a memory bus or memory controller, a peripheral bus, and a local bus using any of a variety of conventional bus architectures. System memory 302 includes read only memory (ROM) 304 and random access memory (RAM) 305. A basic input/output system (BIOS), containing the basic routines that help to transfer information between elements within the personal computer 300, such as during start-up, is stored in ROM 304.

Personal computer 300 further includes a hard disk drive 307 and a magnetic disk drive 308 to read from or write to a removable disk 309, and an optical disk drive 310 to read a CD-ROM disk 311 or to read from or write to other optical media Hard disk drive 307, magnetic disk drive 308, and optical disk drive 310 are connected to system bus 303 by a hard disk drive interface 312, a magnetic disk drive interface 313, and an optical drive interface 314, respectively. The drives and their associated computer-readable media provide nonvolatile storage of data, data structures, computer-executable instructions, etc. for personal computer 300. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the operating environment.

A number of program modules may be stored in the drives and RAM 305, including an operating system 315, one or more application programs 316, other program modules 317, and program data 318.

A user may enter commands and information into personal computer 300 through a keyboard 320 and pointing device, such as a mouse 322. Other input devices (not shown) may include a microphone, joystick, game pad, satellite dish, scanner, or the like. These and other input devices are often connected to processing unit 301 through a serial port interface 326 that is coupled to system bus 303, but may be connected by other interfaces, such as a parallel port, game port or a universal serial bus (USB). A monitor 327 or other type of display device is also connected to system bus 303 via an interface, such as a video adapter 328. In addition to monitor 327, personal computers typically include other peripheral output devices (not shown), such as speakers and printers.

Personal computer 300 may operate in a networked environment using logical connections to one or more remote computers, such as a remote computer 329. Remote computer 329 may be a server, a router, a peer device or other common network node, and typically includes many or all of the elements described relative to personal computer 300, although only a memory storage device 330 has been illustrated in FIG. 2. The logical connections depicted in FIG. 2 include a local area network (LAN) 331 and a wide area network (WAN) 332. Such networking environments are commonplace in offices, enterprise-wide computer networks, intranets and the Internet.

When used in a LAN networking environment, personal computer 300 is connected to local network 331 through a network interface or adapter 333. When used in a WAN networking environment, personal computer 300 typically includes a modem 334 or other means for establishing communications over wide area network 332, such as the Internet. Modem 334, which may be internal or external, is connected to system bus 303 via serial port interface 326. In a networked environment, program modules depicted relative to personal computer 300, or portions thereof, may be stored in the remote memory storage device. It will be appreciated that the network connections shown are one example, and that other means of establishing a communications link between the computers may be used.

In accordance with the practices of persons skilled in the art of computer programming, the present invention is described below with reference to acts and symbolic representations of operations that are performed by the personal computer 300, unless indicated otherwise. Such acts and operations are sometimes referred to as being computer-executed. It will be appreciated that the acts and symbolically represented operations include the manipulation by the processing unit 301 of electrical signals representing data bits which causes a resulting transformation or reduction of the electrical signal representation, and the maintenance of data bits at memory locations in the memory system (including the system memory 302, hard drive 307, floppy disks 309, and CD-ROM 311) to thereby reconfigure or otherwise alter the computer system's operation, as well as other processing of signals. The memory locations where data bits are maintained are physical locations that have particular electrical, magnetic, or optical properties corresponding to the data bits.

Client-Server System With Search Engine

Figure 4:
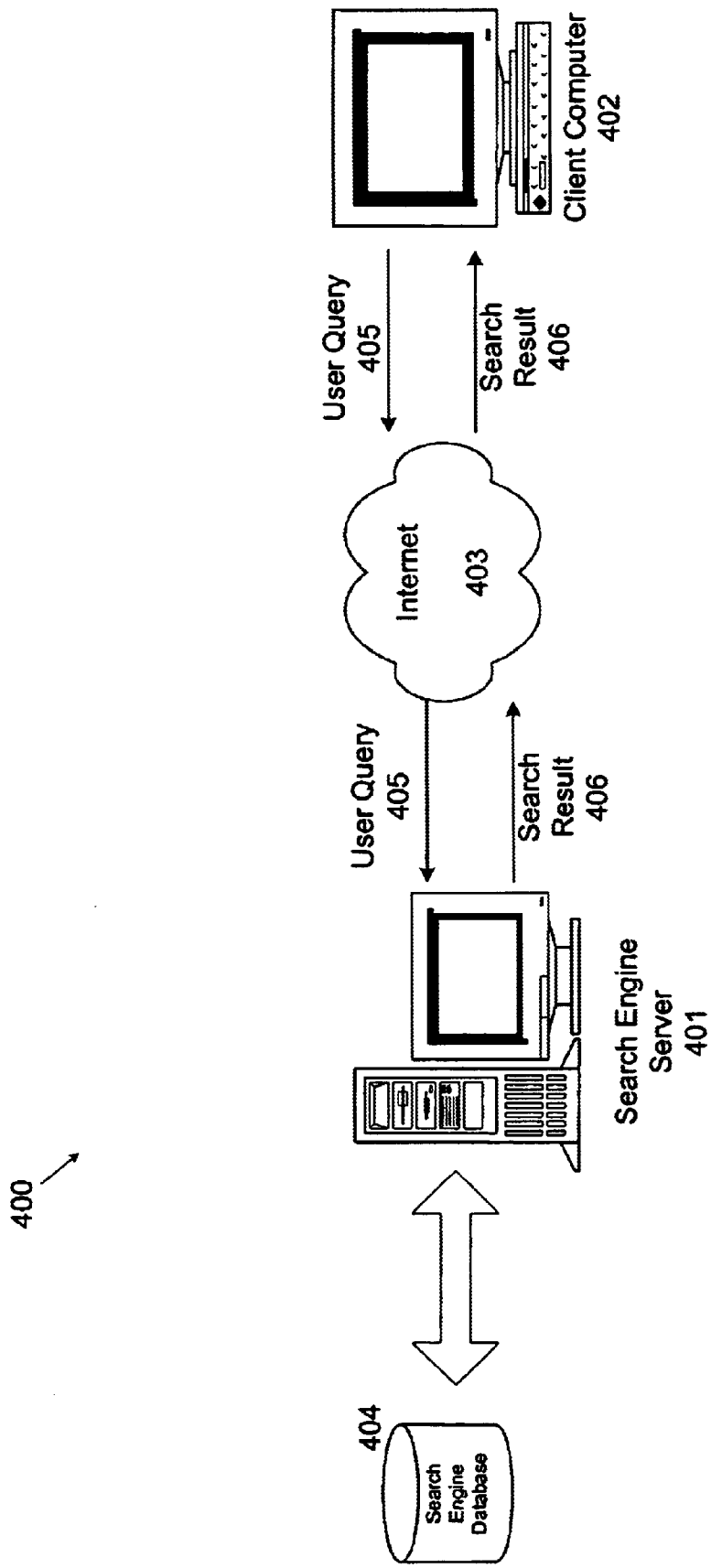
FIG. 4 is a block diagram of a client-server system in which a search engine server is queried by a user, according to the present invention.

FIG. 4 is a block diagram of a client-server system 400 in which a search engine server 401 is queried by a client computer 402. Client-server system 400 includes client computer 402 coupled to search engine server 401 via Internet 403. Although FIG. 4 shows Internet 403 interconnecting client computer 402 and search engine server 401, it should be appreciated that client computer 402 could be implemented with Internet 403 replaced with an alternate communications network, for example a local area network (LAN) or wide area network (WAN). Client computer 402 may comprise a personal computer (as shown in FIG. 3) that has Internet html-based browser software installed thereon, for example INTERNET EXPLORER available from MICROSOFT Corporation. It should be understood that while one client computer 402 is shown in FIG. 4, in practice, there may be many terminals simultaneously accessing search engine server 401. Search engine server 401 is coupled to a search engine database 404. It should be appreciated that search engine server 401 may serve requests using various types of protocol, depending on the type of protocol used by client computer 402. Moreover, although one search engine server 401 is shown in FIG. 4, it should be appreciated that there may be many individual server devices acting in unison to respond to the plurality of received search queries.

Figure 7:
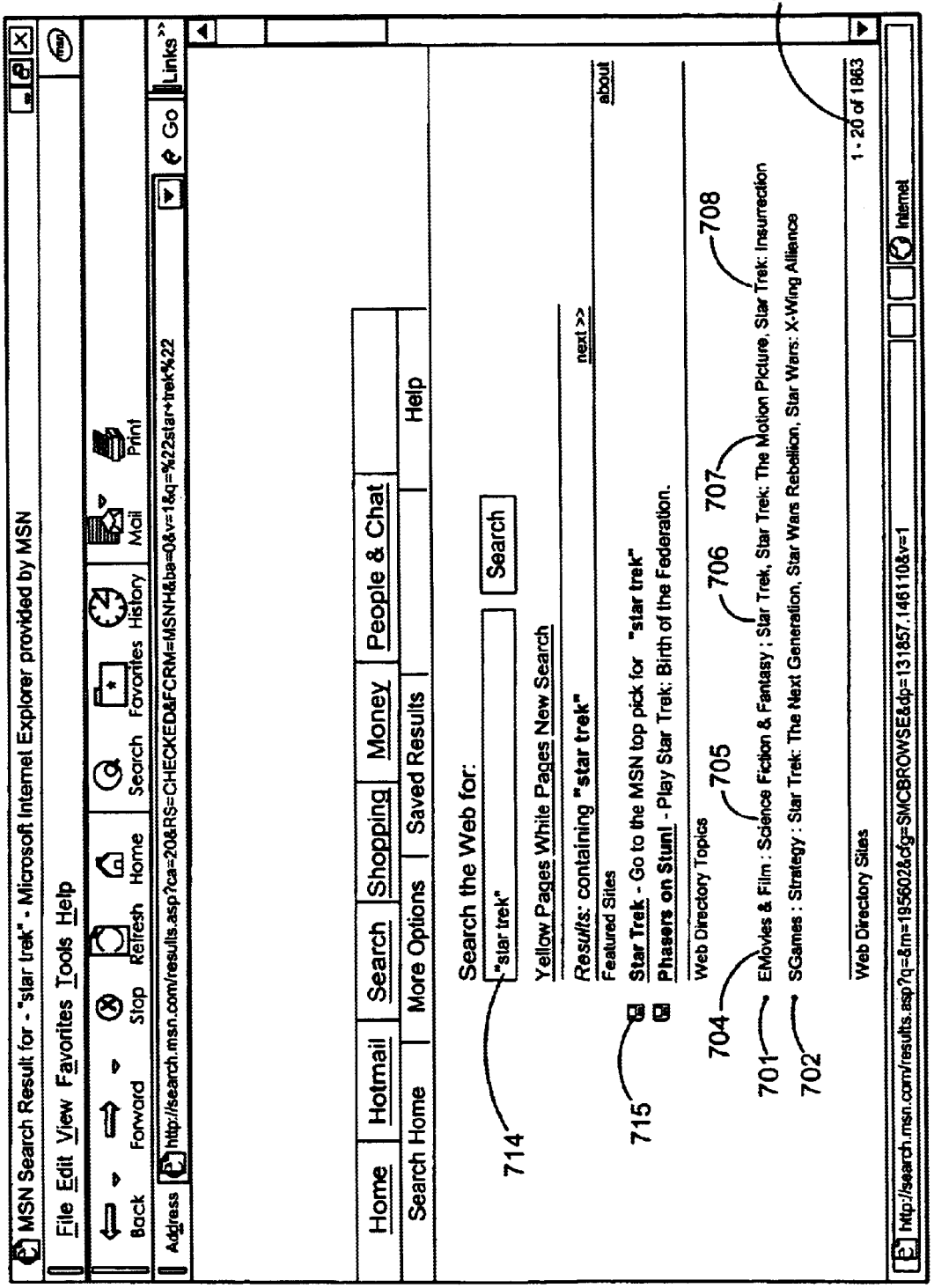
FIG. 7 is a sample search result, according to the present invention.

Client computer 402 may include a browser, or front-end software, to send a user query 405 to search engine server 401. User query 405 may contain various combinations of inputted characters, for example, alphanumeric or ASCII entities. It should be appreciated that user query 405 may also include non-alphanumeric, graphic-based entities including, but not limited to, bit-mapped graphic images. Search engine server 401 receives user query 405 via Internet 403. Search engine server 401 then queries search engine database 404, based on user query 405. Search engine database 404 includes a collection of web site unique resource locators (URL) organized in a hierarchical taxonomy, as shown in FIG. 1B. The hierarchical taxonomy may be defined by category titles that describe the content of some or all of the web sites under which they are cataloged. Search engine server 401 thus compares user query 405 to the categories located in search engine database 404. If search engine database 404 contains categories sufficiently similar to user query 405 (as discussed below in step 502 of FIG. 5), search engine server 404 provides a search result 406 that contains either a formatted list of matching categories (as shown in FIG. 7) or the web sites themselves. If search result 406 contains the formatted list of matching categories, the user may select the matching category to view the individual web sites cataloged within the category.

Method of Operation

Figure 5:
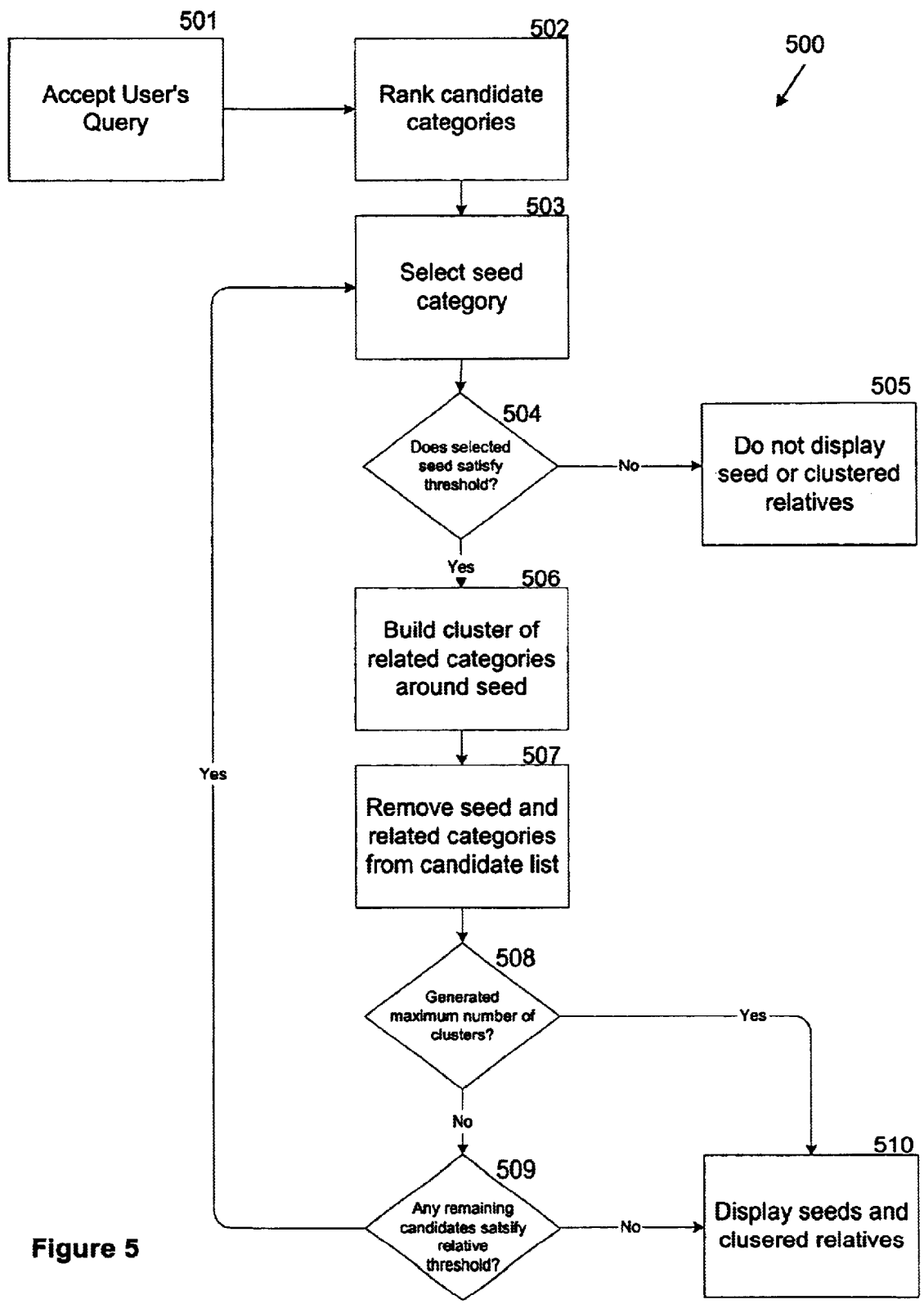
FIG. 5 is a flow diagram of a method for retrieving categories in a branch/node hierarchical taxonomy, according to the present invention.

FIG. 5 provides a flow diagram 500 of a method for retrieving categories (and the information they contain) in a branch/node hierarchical taxonomy, similar to the taxonomy shown in FIG. 1B. In step 501, search engine server 401 queries search engine database 404, based on user query 405 received via Internet 403. In step 502, search engine server 401 compares and ranks each of the categories (i.e., nodes) of the hierarchical taxonomy located in search engine database 404.

Because each category is defined by its ancestor and descendent categories and the web sites that it catalogues, step 502 scores and ranks the individual categories based on a relation of each category's content (e.g., web sites and category title) to user query 405, as well as a relation of the category's ancestors and descendents (i.e., grandparents, parents, children, and siblings) to user query 405. For example, if a category contains many web sites that are highly relevant to user query 405, then the category is itself relevant regardless of how poorly its title corresponds to user query 405. In addition, if several categories are moderately good matches for a query, then the common parent of those categories may be a more useful starting point than the list of individual child categories. Also, if two categories are a close match to user query 405, but one of the matching categories also has children that match user query 405, that category will be scored higher than the one whose children do not match. By assessing each category based on its ancestor and descendent categories as well as its contained web sites, the present invention accounts all such possibilities, and thus selects the category most relevant to user query 405, called the "seed category."

Scoring and ranking the categories is accomplished by applying set of heuristics in the form of ranking metrics. In ranking each of the individual categories, the present invention recognizes that certain matching characteristics are more significant than others. The following list provides some examples of potential ranking metrics. It should be appreciated that this list is not exhaustive, and that some or all of these metrics may be used in various orders of priority.

(1) Whether there is a "synonym set (synset) only" match on the category. A synset is a list of synonymous word forms that are interchangeable in some context. Generally, there are two types of synsets: lexical and semantic. Lexical relations occur among word forms and semantic relations occur among word meanings.

(2) Whether there is an "ideal match" on the category. An "ideal match" is a highly similar, but not quite exact match between the user's query and a category's property.

(3) The total number of child categories and child web sites that have "synset only" matches.

(4) The total number of children categories and child web sites that have "perfect" matches.

(5) The maximum number of non-stopwords that match a category or its child categories. A stopword is a commonly-used word that has very little significance to a search query (e.g., "a," "the").

(6) Whether the source of the maximum number of non-stopwords is the category or its children.

(7) The maximum number of bigrams matched on a category or on its child categories. Bigram mathcing involves comparing two adjacent characters in a word (e.g, a bigram in "Pokemon" includes "Po"), or two words that are matched adjacent and in sequence. Thus, bigram matching is a measure of the degree to which a query matches a category.

(8) Whether the source of the maximum number of bigrams is the category or its children.

(9) The type of property in the query that was matched. An indexed document may have many different types of properties, for example, synset association and title name. Certain of these properties may be predetermined to be more significant than others.

(10) "Property weight" of the property with the most non-stopwords. "Property Weight" is a measure of the association between a "property" (as described above) and the document to which that property is attached. For example, "property weight" may measure the relevance between a keyphrase and a site to which it is associated. For example, if the "ford.com" site has two keyphrases, "ford" and "ford motors," the "ford motors" keyphrase may have a greater property weight than the "ford" keyphrase, because of the "ford" keyphrase's possible association with other "ford"-related sites, like "bettyfordclinic.com."

(11) Rarity index of the most rare word that matches. Query words that occur in fewer categories in a database have more meaning when searching. Therefore, if a query is rare, but matches a category it may be more significant than a common word match.

(12) The total number of child categories that match any part of the query.

(13) The total number of child sites that match any part of the query.

Returning to FIG. 5, in step 503, after ranking the candidate categories in the hierarchical taxonomy, search engine server 401 selects the seed category. It should be appreciated that step 503 may select the highest-ranked candidate, the lowest-ranked candidate, or any other predetermined ranking. In step 504, it is determined whether the selected seed category satisfies a predetermined minimum threshold of relevancy. This predetermined threshold ensures that the only seeds displayed are those that have a predetermined minimum level of commonality with user query 405. The relevancy threshold may be based on any degree of common features between user query 405 and the categories. For example, using a stopword/bigram matching commonality scheme, the following table may represent one example of an adaptive threshold determinant:

| Number of non-stopwords in query | Number of non-stopwords that must be matched |
| --- | --- |
| 1 | 1 |
| 2 | 2 |
| 3 | 2 + a bigram match, or 3 |
| 4 | 3 + a bigram match, or 4 |
| 5 | 4 + a bigram match, or 5 |
| 6+ | 5 + a bigram match, or 6 |

In this example, as the number of non-stopwords in the user's query increases, the number of required matching words accordingly increases. However, once the user's query includes three or more non-stopwords, the number of matching non-stopwords required to satisfy the threshold may be reduced by one, assuming there is a corresponding bigram match. For example, if the user inputs the search term "The Stars," the threshold will be satisfied if at least one category sufficiently matches (according to the predetermined ranking metric scheme) the non-stopword "Stars."Furthermore, if the user inputs the search term "Star Wars: The Next Generation," the threshold should be satisfied if at least one category sufficiently matches all four non-stopwords, or if at least one category sufficiently matches three of the four non-stopwords (e.g., "Star," "Wars," and "Next") and two of these matched non-stopwords are consumed by a "bigram" match. For example, if "star wars" is matched, this is a bigram. It should be appreciated that the type of threshold relevancy scheme used may vary.

In step 505, if the selected seed category does not satisfy the relevancy threshold, process 500 ceases and no further seeds are displayed. If, on the other hand, the selected seed category satisfies the threshold, process 500 moves to step 506. In step 506, search engine server 401 builds a cluster of ancestor and descendent categories around the seed category. The cluster of ancestor and descendent categories may include a grandparent, parent, child and sibling, or any combination thereof. In one embodiment, the displayed cluster may be in the following order "grandparent, parent, seed, child/sibling, child/sibling" (as shown in FIG. 7). The building of the family cluster in step 506 is further discussed below with reference to FIG. 6.

In step 507, the seed category selected in step 503 and its cluster of ancestor and descendent categories generated in step 506 are removed from the list of candidate categories generated in step 502. By removing the selected category in step 506, and thus from the next seed selection and corresponding family cluster (see step 509), redundancies in the returned results are eliminated. In step 508, if the threshold number of seeds have been selected and corresponding family clusters generated, the seeds and their family clusters are displayed in step 510. The threshold number of selected seeds is a predetermined value that may vary depending on screen presentation concerns. In one embodiment (as shown in FIG. 7), the predetermined value is set at a maximum of two. If, on the other hand, the threshold number of seeds has not been selected, the process proceeds to step 509. In step 509, if the remaining top-ranked potential seed categories are below a predetermined value as compared to the previously selected seed category, only the previously selected seeds and their selected ancestors and descendents are displayed in step 510. Step 509 ensures that the displayed clusters have some predetermined minimal relevancy, and are not displayed simply to satisfy the threshold number of seeds, set in step 508. For example, if just one cluster has been selected for display, step 509 will prevent a second low-relevancy cluster from being displayed simply because only one other cluster has been selected. If, on the other hand, the remaining top-ranked potential seed categories are not below a predetermined value as compared to the previously selected seed category, process 500 returns to step 503 to select a new seed candidate and begin the family clustering process anew.

Figure 6:
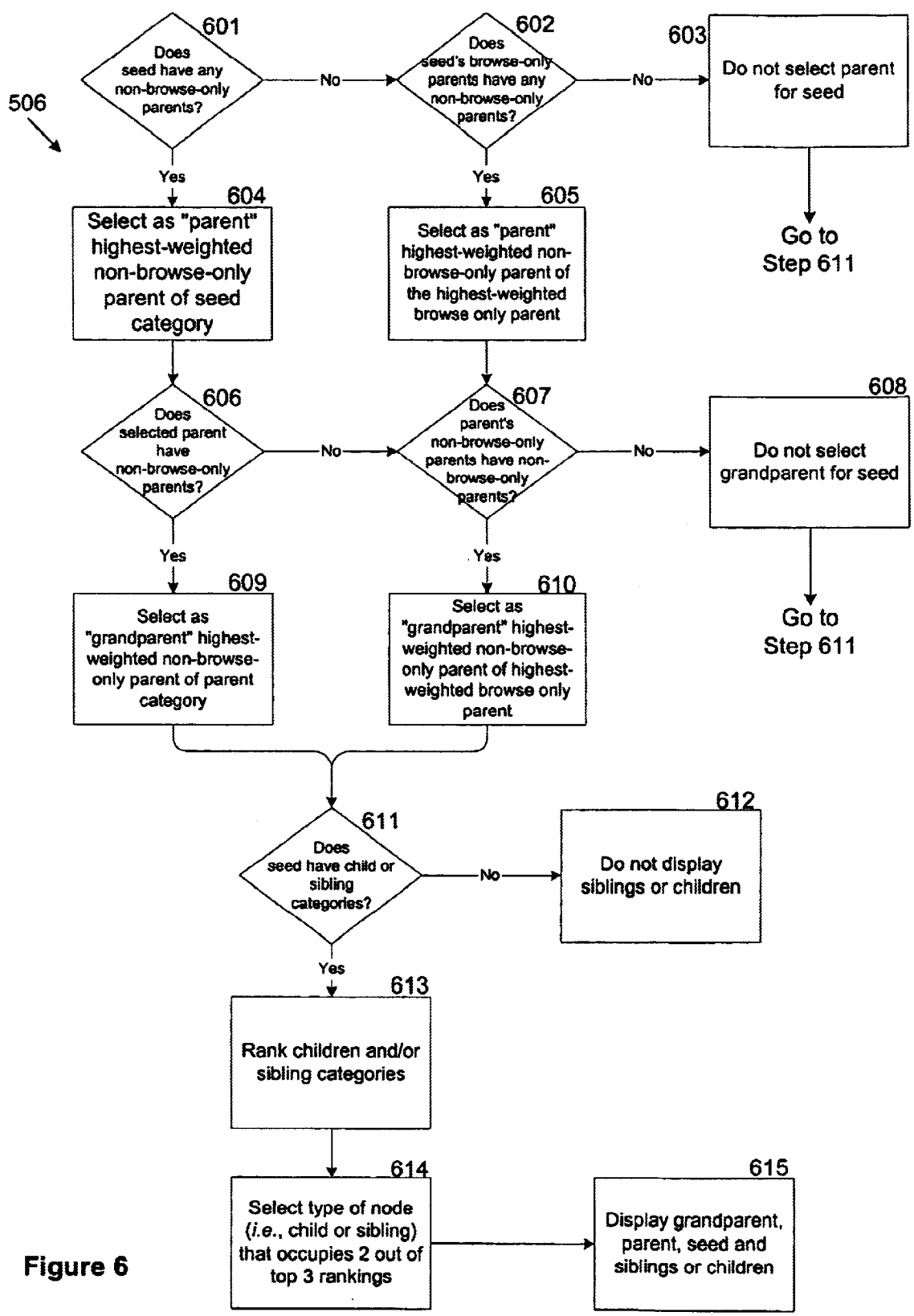
FIG. 6 is a flow diagram of a method for clustering categories in a branch/node hierarchical taxonomy, according to the present invention.

FIG. 6 provides a flow diagram of the family clustering process, identified as step 506 in FIG. 5. In step 601, process 506 determines whether the selected seed category has non-browse-only parents. A browse-only category is a navigation aid that exists solely to provide fewer browsing choices, but has no contextual importance to the search result. For example, in the following path "Actors>By Last Name>A–F>G–Z," the categories "A–F" and "G–Z" are "browse-only" because they are only relevant as navigation aids. A non-browse-only category, on the other hand, has some contextual importance. If the seed category has non-browse-only parents, the non-browse-only parent that is ranked the highest is selected as the parent of the seed category in step 604. The ranking of the non-browse-only parents may be similar to the ranking of the seed category itself, as described for step 502 in FIG. 5. If, on the other hand, the seed has only browse-only parents, step 602 determines whether those browse-only parents have any non-browse-only parents. If the browse-only parents of the seed have non-browse only parents, the non-browse-only parent that is ranked the highest is selected as the parent of the seed category in step 605. If, on the other hand, the seed's browse-only parents have only browse-only parents, no parent will be selected, as in step 603. Having no parents to select from means that the seed will have no grandparents to select from, and thus process 506 will proceed to step 611.

However, if a parent has been selected either in step 604 or step 605, process 506 will proceed to select a grandparent, in a manner similar to the selection of the parent, discussed above. In step 606, it is determined whether the selected parent category has non-browse only parents. If the selected parent category has non-browse-only parents, the non-browse-only parent that is ranked the highest is selected as the parent of the selected parent category in step 609, and thus the grandparent of the seed category. The ranking of the grandparents may be similar to the ranking of the seed itself, as described for step 502 in FIG. 5. If, on the other hand, the selected parent has only browse-only parents, step 607 determines whether those browse-only parents have any non-browse-only parents. If the browse-only parents of the selected parent have non-browse-only parents, the non-browse-only parent that is ranked the highest is selected as the parent of the selected parent in step 610, and thus the grandparent of the seed category. If, on the other hand, the selected parent's browse-only parents have only browse-only parents, no grandparent will be selected, as in step 608. Regardless of whether and how a parent and grandparent are selected, process 604 will proceed to step 611.

Step 611 begins the process of selecting the seed's children or siblings. In step 611, if it is determined that the seed has no children or siblings, no categories will be selected and displayed as such, as in step 612. If, on the other hand, the seed has children or siblings, the children and siblings will be ranked. The ranking of the children and siblings may be similar to the ranking of the seed itself, as described for step 502 in FIG. 5. Once the siblings and children are ranked in step 613, step 614 selects a quantity of children or a quantity of siblings, depending on which type of category (i.e., child or sibling) makes the majority of the selected positions. For example, if two children or siblings are predetermined to be selected and displayed, and two out of the top three rankings are children, then two children will be displayed. Alternatively, a predetermined number of top-ranked categories may be displayed, regardless of whether they are children or siblings. In step 615, the seed is displayed along with its selected ancestors and descendents, which may include grandparent, parent, siblings and/or children. Alternatively, the seed may be displayed with any one or more of its ancestor and descendent categories.

Sample Display of Search Result

Figure 8:
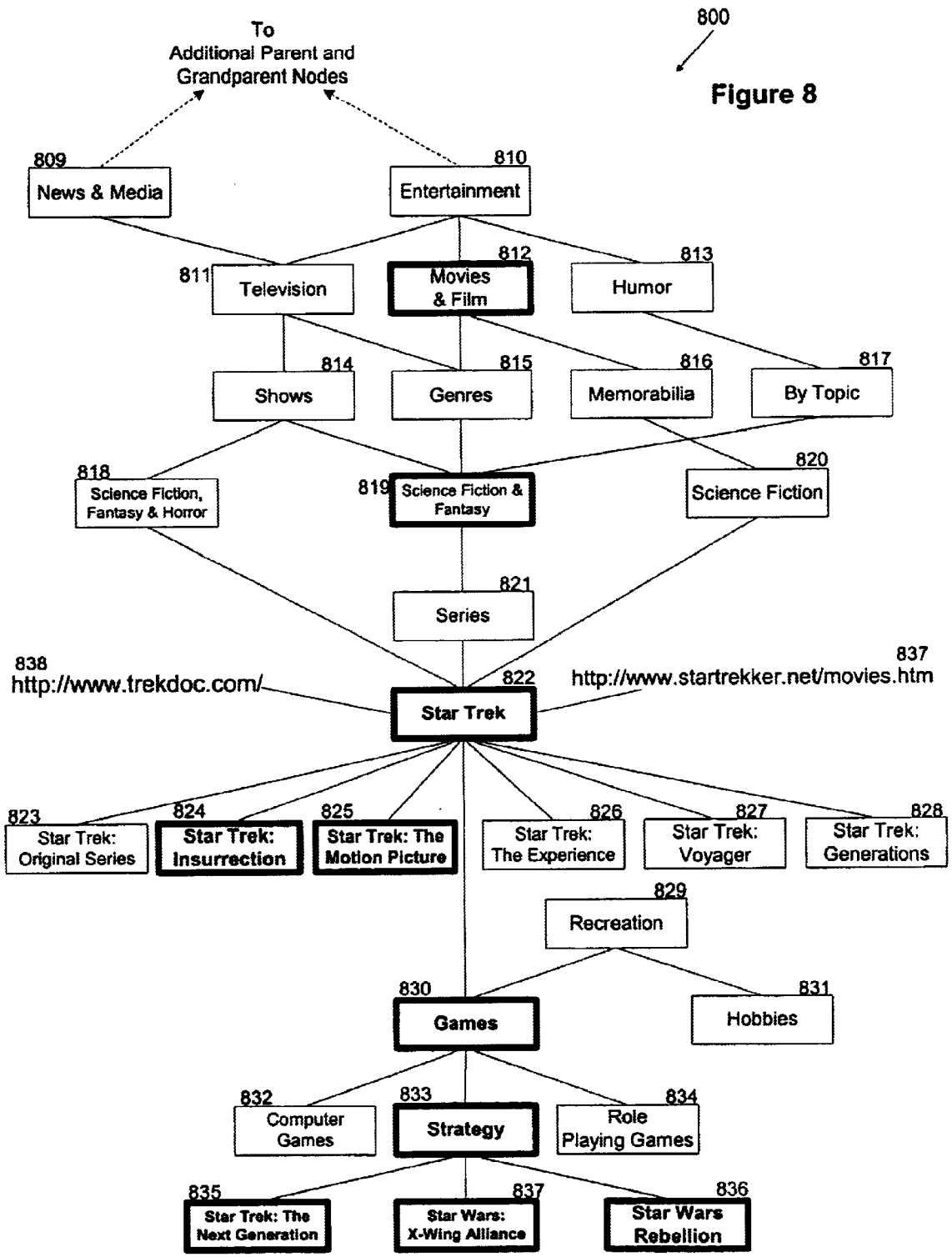
FIG. 8 is an example of a branch/node hierarchical taxonomy tree for the sample search result shown in FIG. 7.

FIG. 7 provides a sample search result using the phrase "Star Trek." The taxonomy for the search result, shown in FIG. 8, is identical to that shown in FIG. 1B. It should be appreciated that the category titles may be different than those shown in FIGS. 7 and 8, and that actual display for the phrase "Star Trek" will vary depending on the actual category titles used in the taxonomy. As shown in FIG. 7, the present invention limits the matching categories and displayed category paths. FIG. 7 provides two discrete category paths 701 and 702, unlike the eighteen category paths provided by the prior art in FIG. 2. In each of the displayed category paths 701 and 702, the seed category is shown bolded. Using category path 701 as a sample, "Movies & Film" 704 is the grandparent category, "Science Fiction & Fantasy" 705 is the parent category, "Star Trek" 706 is the seed category, and "Star Trek: The Motion Picture" 707 and "Star Trek: Insurrection" 708 are the children categories. Also, as shown in FIG. 7, additional relevant information may be provided including the search term "star trek" 714, "Featured Sites" 715, and the number of displayed and available matching web sites 716.

In displaying the cluster of categories, the present invention does not simply dump the entire category path corresponding to a matching category, but instead selects and displays individual categories based on their relevance with the inputted search term, as discussed with reference to FIGS. 5 and 6.

First, the present invention insures that the displayed category paths are distinct. In particular, node 822 (as shown in FIG. 8) is the matching node for category path 701 and node 835 (as shown in FIG. 8) is the matching node for category path. 702. Path 701 focuses on science fiction and fantasy movies and films, while path 703 presents strategy games, including "Star Trek: The Next Generation" 711. Therefore, although both paths are concerned with the query term "Star Trek," they present different aspects of the topic. The ranking and selection of the categories (as described above with reference to FIGS. 5 and 6) determine which of the many available paths will be displayed.

Second, as described with reference to FIGS. 5 and 6, the present invention ranks each ancestor and descendent in the category path and presents only those that are most relevant. For example, in displayed path 701, although the entire taxonomy path is "Entertainment>Movies and Film>Genres>Science Fiction and Fantasy>Series>Star Trek>Star Trek: The Motion Picture" (as shown in FIG. 8) only the most relevant portions of the path are displayed in a cluster, according to the present invention. Therefore, cluster 701 "Movies & Film: Science Fiction & Fantasy: Star Trek, Star Trek: The Motion Picture, Star Wars" is displayed. The bolded "Star Trek" term 706 is the seed path, "Science Fiction & Fantasy" 705 is the parent, and "Movies & Film" 704 is the grandparent. In addition, "Star Trek: The Motion Picture" 707 and "Star Trek: Insurrection" 708 are listed with the seed category "Star Trek" 706. In this example, these categories are children, although these category nodes may either be child nodes or sibling nodes. In this way, although a few categorical alternatives are eliminated, the present invention provides a more readable and useful result to the user.

This selection of ancestral and descendent categories is further illustrated in FIG. 8. The hierarchical taxonomy shown in FIG. 8 is identical to that shown in FIG. 1B, wherein each node 809–837 has a category title or label relating to a search term "Star Trek." The only difference between FIG. 1B and 8 is that the nodes corresponding to the displayed categories in FIG. 7 are shown bolded in FIG. 8. By bolding the displayed nodes, FIG. 8 shows how the present invention ignores certain nodes (e.g., 815, 821, 823, and 826–828) in favor of other nodes (e.g., 812, 819, 822, 824, and 825) determined to be more important to the user's query.

Although the number and ancestors and descendents of the displayed nodes may vary, one embodiment displays the seed category and at least two other categories, one of which is higher in relation to the seed (e.g., grandparent or parent), and the other of which is lower or equal to the seed category (e.g., child or sibling) to the seed category.

The present invention is directed to a system and method for retrieving data from an information database that includes, but is not limited to, interconnection via the Internet, regardless of any specific description in the drawing or examples set forth herein. It will be understood that the present invention is not limited to use of any of the particular components or devices herein. Indeed, this invention can be used in any application that requires data retrieval, including word processor software, for example. Further, the system disclosed in the present invention can be used with the method of the present invention or a variety of other applications.

While the present invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the present invention may be made in the form and details of these embodiments without departing from the true spirit and scope of the invention as defined by the following claims.

We claim:

1. A computer-readable medium for creating a result set for a database query, the result set including selected nodes in a hierarchical taxonomy having computer-executable instructions for performing steps, comprising:

receiving a query;

comparing characteristics of one or more nodes with said query;

ranking said nodes based on a predetermined criteria;

selecting a first node based on said ranking;

selecting one or more related nodes based on said ranking, wherein said related nodes are hierarchically related to said first node; and displaying said first node and said one or more related nodes when said first node and said one or more related nodes satisfy a predetermined threshold based on said ranking.

2. The computer-readable medium of claim 1, wherein said displaying further comprises organizing said one or more related nodes around said first node such that a hierarchical relation of said related nodes to said first node is apparent.

3. The computer-readable medium of claim 1, having further computer-executable instructions comprising ignoring said first node and repeating said steps of selecting.

4. The computer-readable medium of claim 1, wherein said characteristics of said node include node designation, said related nodes, and files associated with said node.

5. The computer-readable medium of claim 4, wherein said files associated with said node include Internet web sites.

6. The computer-readable medium of claim 1, wherein said query includes words, numbers, and/or images.

7. The computer-readable medium of claim 1, wherein said first node has a higher ranking than said related nodes.

8. The computer-readable medium of claim 1, wherein said one or more related nodes have a higher ranking than other nodes related to said first node.

9. The computer-readable medium of claim 1, wherein said predetermined criteria is based on common structures between said characteristics of said nodes and said query.

10. The computer-readable medium of claim 1, wherein said nodes are categories of an information database.

11. A method creating a result set for a database query, the result set including selected nodes in a hierarchical taxonomy, the method comprising:

receiving said query;

comparing characteristics of one or more nodes with said query;

ranking said nodes based on a predetermined criteria;

selecting a first node based on said ranking;

selecting one or more related nodes based on said ranking, wherein said related nodes are hierarchically related to said first node; and displaying said first node and said one or more related nodes when said first node and said one or more related nodes satisfy a predetermined threshold based on said ranking.

12. The method of claim 1, wherein said displaying further comprises organizing said one or more related nodes around said first node such that a hierarchical relation of said related nodes to said first node is apparent.

13. The method of claim 11, further comprising ignoring said first node and repeating said steps of selecting.

14. The method of claim 11, wherein said characteristics of said node include node designation, said related nodes, and files associated with said node.

15. The method of claim 11, wherein said files associated with said node include Internet web sites.

16. The method of claim 11, wherein said query includes words, numbers, and/or images.

17. The method of claim 11, wherein said first node has a higher ranking than said related nodes in said hierarchical taxonomy.

18. The method of claim 11, wherein said one or more related nodes have a higher ranking than other nodes related to said first node.

19. The method of claim 11, wherein said predetermined criteria is based on common structures between said characteristics of said nodes and said query.

20. The method of claim 11, wherein said nodes are categories of an information database.

21. A data retrieval system, comprising;
a user input for receiving a query;
a database coupled to said user input, wherein said database comprises data files indexed in hierarchical categories;
a data server coupled to said database, wherein said data server selects a first category and one or more related categories based on a comparison of characteristics of said categories to said query, wherein said one or more related categories are hierarchically related to said first category; and
a display device for displaying said first category and said one or more related categories when said first category and said one or more related categories satisfy a predetermined threshold based on a ranking.

22. The data retrieval system of claim 21, wherein said data server further comprises a predetermined criteria for selecting said first category and said one or more related categories.

23. The data retrieval system of claim 22, wherein said predetermined criteria is a function of common structures between said characteristics of said category and said query.

24. The data retrieval system of claim 22, wherein said first category satisfies more of said predetermined criteria than other hierarchical categories, and wherein said one or more related categories satisfy more of said predetermined criteria than other categories related to said first category.

25. The data retrieval system of claim 21, wherein said data server further comprises a removal component that ignores said first category and repeats said selections.

26. The data retrieval system of claim 21, wherein said characteristics of said categories include category designation, said related categories, and said data files indexed in said hierarchical categories.

27. The data retrieval system of claim 21, wherein said query includes words, numbers, and/or images.

28. The data retrieval system of claim 21, further comprising one or more data entry terminals coupled to said user input for allowing a user to enter said query.

29. A data retrieval device, comprising:
a search component for selecting a first category and selecting one or more related categories based on a comparison of characteristics of said categories to a query: wherein said search component further comprises a predetermined criteria for selecting said first category and said one or more related categories; and
a user interface component for receiving said query and outputting said fast category and said one or more related categories, wherein said first category satisfies more of said predetermined criteria than other hierarchical categories, and wherein said one or more related categories satisfy more of said predetermined criteria than other categories related to said first category.

30. The data retrieval device of claim 29, further comprising an output component for displaying said first category and said one or more related categories when said first category satisfies a predetermined threshold.

31. A search result obtained from an Internet search engine database based on a user query, wherein said database is organized as nodes in a hierarchical taxonomy, and displaying said information to said user in accordance with the following acts:

providing a server computer in communication with said Internet;
receiving said query from said user by way of said Internet;
ranking said nodes by comparing characteristics of said nodes with said query, wherein said ranking is determined by a predetermined threshold;
retrieving a first node from said database as a function of said query provided by said user;
retrieving one or more nodes related to said first node, based on said ranking, wherein said one or more related nodes have a higher ranking that other nodes related to said first node;
generating said search result as a function of said query; and
displaying said search result on a display of said user by organizing said one or more related nodes around said first node such that a hierarchical relation of said related nodes to said first node is apparent.

32. The search result of claim 31, wherein further comprising ignoring said first node and repeating said steps of retrieving.

33. The search result of claim 31, wherein said nodes represent categories of Internet web sites.

34. The search result of claim 31, wherein said first node has a higher ranking than said related nodes.

35. A method of retrieving data on an information network, wherein said data is indexed in categories of a hierarchical taxonomy on a database, comprising the steps of:
receiving a query to said database via said information network, wherein said query includes words, numbers, and/or images;
comparing characteristics of said categories with said query, wherein said characteristics of said categories include category designation, said related categories, and data files associated with said categories;
ranking said categories based on a predetermined criteria, wherein said predetermined criteria is based on common structures between said characteristics of said categories and said query;
selecting a first category based on said ranking, wherein said first category has a higher ranking than other categories in said hierarchical taxonomy;
selecting one or more related categories based on said ranking, wherein said related categories are hierarchically related to said first category, and wherein said one or more related categories have a higher ranking than other categories related to said first category;
when said first category satisfies a predetermined threshold, displaying said one or more related categories around said first category such that a relation of said related categories to said first category is apparent, wherein said predetermined threshold is based on said ranking; and
ignoring said first category and repeating said steps of selecting.

* * * * *

UNITED STATES PATENT AND TRADEMARK OFFICE
CERTIFICATE OF CORRECTION

PATENT NO. : 6,704,729 B1  Page 1 of 1
APPLICATION NO. : 09/575481
DATED : March 9, 2004
INVENTOR(S) : Klein et al.

It is certified that error appears in the above-identified patent and that said Letters Patent is hereby corrected as shown below:

<u>Column 9</u>:
Line 20, delete "mathcing" and insert therefor -- matching --.

<u>In the Claims</u>:

Claim 21, Column 15, line 4, after "date files" insert -- ; --.

Claim 29, Column 15, line 49, delete "fast" and insert therefor -- first --.

Signed and Sealed this

Ninth Day of January, 2007

JON W. DUDAS
*Director of the United States Patent and Trademark Office*